United States Patent [19]

Isaksson et al.

[11] Patent Number: 5,652,772
[45] Date of Patent: Jul. 29, 1997

[54] METHOD AND APPARATUS FOR SYNCHRONIZATION IN DIGITAL TRANSMISISON SYSTEMS OF THE OFDM TYPE

[75] Inventors: Mikael Isaksson; Bo Engstrom, both of Lulea, Sweden

[73] Assignee: Telia AB, Farsta, Sweden

[21] Appl. No.: 537,863

[22] PCT Filed: Jun. 9, 1994

[86] PCT No.: PCT/SE94/00560

§ 371 Date: Jan. 22, 1996

§ 102(e) Date: Jan. 22, 1996

[87] PCT Pub. No.: WO95/03656

PCT Pub. Date: Feb. 2, 1995

[30] Foreign Application Priority Data

Jul. 20, 1993 [SE] Sweden .................................. 9302453

[51] Int. Cl.⁶ ......................................................... H04L 7/00
[52] U.S. Cl. ............................................. 375/367; 375/376
[58] Field of Search ..................................... 370/106, 107, 370/19; 375/367, 376, 368

[56] References Cited

U.S. PATENT DOCUMENTS

| 4,095,226 | 6/1978 | Kratzer ..................... 375/367 |
| 4,301,534 | 11/1981 | Genter ..................... 370/107 |
| 5,148,451 | 9/1992 | Otani et al. . |
| 5,313,169 | 5/1994 | Fouche et al. ..................... 375/376 |
| 5,345,440 | 9/1994 | Gledhill et al. ..................... 375/376 |
| 5,444,697 | 8/1995 | Leung et al. ..................... 370/19 |
| 5,506,836 | 4/1996 | Ikeda et al. ..................... 370/19 |

FOREIGN PATENT DOCUMENTS

| 0556807 | 8/1993 | European Pat. Off. . |
| 92/10043 | 6/1992 | WIPO . |

*Primary Examiner*—Stephen Chin
*Assistant Examiner*—Joseph Roundtree
*Attorney, Agent, or Firm*—Oblon, Spivak, McClelland, Maier & Neustadt, P.C.

[57] ABSTRACT

The invention relates to a method and apparatus for synchronization of transmitters and receivers in digital transmission systems of the OFDM type. The system uses FFT technique to carry out the modulation and demodulation procedures. According to the invention, the transmitter sends synchronization frames with known frequencies and phase positions and with known time intervals in certain time slots. The receiver carries out a series of time-shifted FFT operations over the time position where the synchronization frame is calculated to be. For each operation, a cross-correlation is carried out in the frequency plane of the output signal with the known frequency function of the synchronization frame. The correlation maximum is detected, and this determines the time slot which contains the synchronization frame, whereupon this is used as time base for the following data frames.

14 Claims, 3 Drawing Sheets

METHOD AND APPARATUS FOR SYNCHRONIZATION IN DIGITAL TRANSMISISON SYSTEMS OF THE OFDM TYPE

FIELD OF THE INVENTION

The present invention relates to a method and apparatus to determine synchronization parameters for time shift, phase turning and frequency drift in a broad-band digital transmission system of the OFDM type (Orthogonal Frequency Division Multiplexing). The technique which is used is that certain time slots have known synchronization frames containing tones or subcarriers in the whole frequency spectrum with known phase selected in accordance with a pseudo-random pattern (PRBS-sequences).

The receiver carries out a series of time-shifted FFT operations over the time position where the synchronization frame is calculated to he. For each FFT operation a cross-correlation is carried out in the frequency plane of the output signal with the known frequency function of the synchronization frame. The cross-correlation means that a very well-defined correlation maximum is only obtained when the FFT operation is carried out in exactly the correct time slot. The phase for the cross-correlation maximum shows clearly on the synchronization frame phase and is used for phase correction during demodulation of data. The frequency deviation which is used when regulating this can be calculated from the cross-correlation. The frequency error is obtained by reading off the position of the cross-correlation maximum in the correlation sequence.

The apparatus is provided with RAM memory, FFT processors and digital signal processors (DSP).

STATE OF THE ART

It is already known to use correlation calculations between a known and a received sequence in the frequency plane.

U.S. Pat. No. 4,577,334 shows a receiver for digital data modulated on a carrier wave signal. At the beginning of a data transmission, a training sequence with a known frequency is transmitted. The receiver contains circuits for determining certain parameters such as the phase between the transmitted training sequence and a corresponding sequence generated in the receiver. The receiver uses a DFT (Discrete Fourier Transform) filter to determine the correlation between the input signal and a locally generated frequency.

U.S. Pat. No. 4,754,449 describes a receiver which, using a Fourier transformer, receives a number of FDMA channels and transforms these into a single TDM channel. Any phase error in the incoming information is detected by allowing a symbol window to sweep forwards and backwards over the incoming symbols. An error signal is generated if a time shift is detected for an individual symbol compared to previous transmissions.

U.S. Pat. No. 4,701,939 relates to a method and equipment for obtaining synchronization between a transmitter and a receiver. Synchronization sequences are transmitted in the form of pseudo-random patterns. The received synchronization sequences are compared by an auto-correlation technique with known sequences, and in this way synchronization between the transmitter and receiver can be obtained.

U.S. Pat. No. 5,148,451 concerns a device for synchronizing a mobile unit with an incoming carrier wave. The incoming carrier wave is modulated with data and a unique sequence. This unique sequence is periodically incorporated in the data information in each frame. The unique sequence is also stored locally in the mobile units. A circuit performs a cross-correlation between the modulated unique sequence and the stored sequence. The result of the cross-correlation is used for frame and carrier wave synchronization.

It is, however, not known to perform time-shifted FFT operations and cross-correlate the result in the frequency plane and to use such synchronization methods in OFDM networks.

BRIEF DESCRIPTION OF THE DIAGRAMS

The invention will now be described in detail with reference to the attached diagrams, of which FIG. 1 is a block diagram of the transmitter and the receiver in an OFDM system, FIG. 2 shows the insertion of synchronization frames in accordance with the present invention, FIG. 3 shows a diagram of the detection of a synchronization frame, and FIG. 4 is a block diagram of the synchronization part in the receiver in accordance with the present invention.

DETAILED DESCRIPTION OF PREFERRED EMBODIMENTS

In order to make it easier to understand the invention we will first present a brief general description of the modulation method OFDM and its characteristics.

By OFDM is meant Orthogonal Frequency Division Multiplexing. The basic idea of OFDM modulation is that the data to be transmitted is divided up into a large number (N) of modulated subcarriers so that each of the subcarriers is given a low bit speed. The reason for this is to counteract the effects of frequency-selective fading which causes inter-symbol interference. By using a large number of frequency-divided channels where each one has a symbol time which is considerably longer than the length of the channel's time dispersion, the effect of this problem is reduced. In frequency-selective fading, different parts of the frequency spectrum are damped greatly in different ways, resulting in dips in the frequency band. For OFDM-modulation this means that certain subcarrier channels can be completely or partly extinguished, which means that the information from these is lost. This information can be regained by channel coding. The modulation method using combined OFDM and channel coding is usually called COFDM (Coded OFDM).

What distinguishes conventional frequency-division modulation from OFDM is that the frequency spectrum of the adjacent subcarriers overlaps, which gives an optimal frequency utilization. This can be carried out by the signals having orthogonal characteristics which make it possible to modulate each channel so that the neighbouring channels are not disturbed. An attractive feature of this is that the modulation and demodulation processes can be carried out using FFT technique (Fast Fourier Transform).

Figure 1:
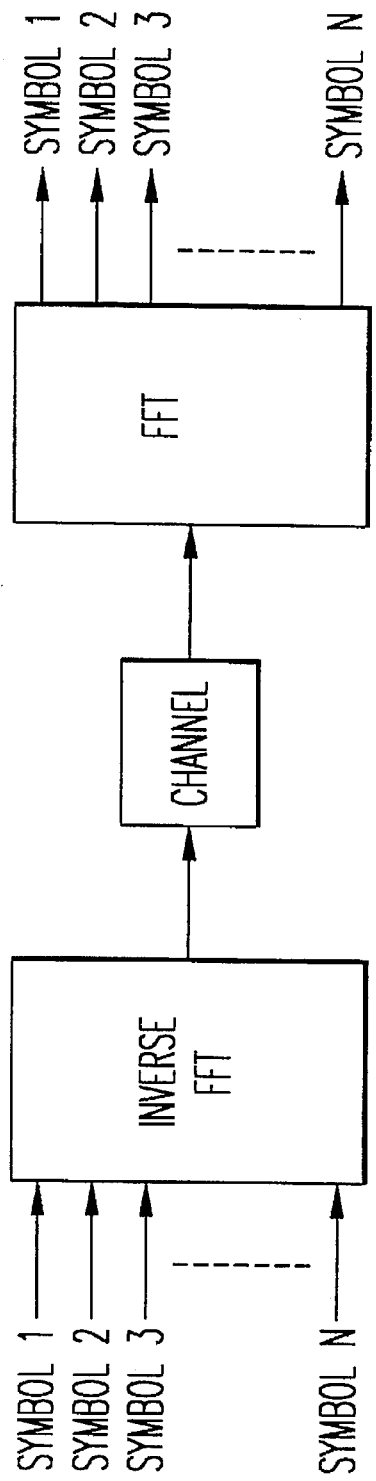

FIG. 1 shows a block diagram of the transmitter and the receiver in an OFDM system. Inverse FFT is carried out in the transmitter on a block of N symbols. The symbols before the IFFT operation can be regarded as frequency functions for each subcarrier and can be given any modulation form. The time function of the symbols is transmitted over the channel, and FFT of this is carried out in the receiver before demodulation of the data.

Figure 2:
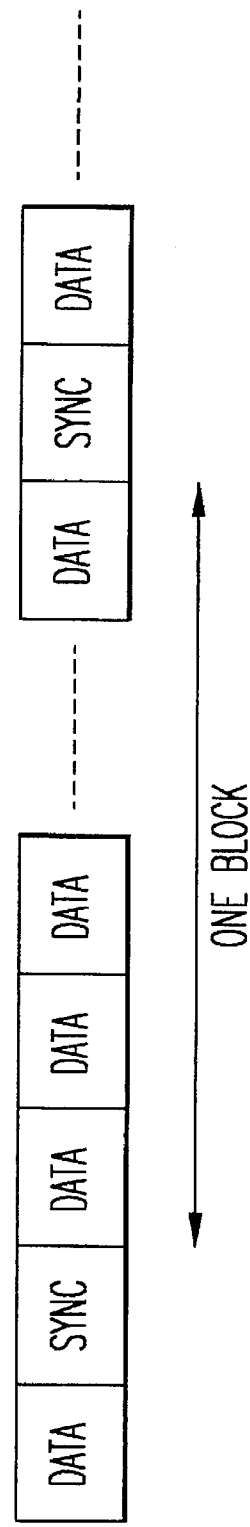

The present invention provides a method for synchronizing OFDM systems of the above type. The method is based on inserting known synchronization frames in time. The synchronization frames frame a number N of data frames which form a block, as shown in FIG. 2.

The purpose of the synchronization frames is to make it possible, via digital signal processing in the receiver, to estimate a time reference for sampling of data. In addition the signal processing permits the estimation of the phase turning the channel has given the synchronization frame and an estimate of the frequency drift. These parameters are then used in the detection of subsequent data frames. The concept is based on assuming that the channel is approximately stationary (time invariant) between the synchronization frames so that the parameters estimated can be used in the detection of subsequent data frames. The synchronization frames are repeated at known intervals which are selected based on the channel's rate of change, ie the rate the parameters vary, and on the calculation capacity which is required to estimate the synchronization parameters.

The synchronization frame is designed for processing in the frequency plane through FFT technique and cross-correlation. It is of the utmost importance that the whole frequency spectrum is used in order to give robustness against frequency-selective fading.

The frame consists of known frequencies with known phase positions. The frequencies are divided by number and frequency separation in such a way that during the FFT operation in the receiver the same number of samples are taken as the number of points in the FFT. The frequencies are selected with such separation that they lie exactly in frequency for each point in the FFT. The phase position for each frequency is selected in accordance with a PRBS pattern (Pseudo Random Binary Sequence) consisting of −1 and 1. For example, so-called M sequences can be used as PRBS sequence. The choice of PRBS sequences is to be based on the auto-correlation characteristics and is one of the cornerstones of the synchronization method.

The synchronization frame is generated by inverse FFT (IFFT) in the transmitter. According to the invention the synchronization frame is generated by generating frequencies (tones) in the frequency plane with predetermined phase, calculating IFFT, and transmitting the time function of the operation in the time slots concerned between the data frames. Since the synchronization frame is known and repeated continuously, the IFFT operation can be carried out in advance and stored in EPROM. This stored time function of the synchronization frame can thereby be transmitted by direct reading from EPROM in the predetermined time slots.

The receiver has a measure on time position and phase for the previous synchronization frame. On account of distortion of the channel and shortcomings in the transmitter and receiver, these parameters must be updated for each new block of data frames. To update these parameters the previous time position is used to find the new one by carrying out a series of FFT operations.

Figure 3:
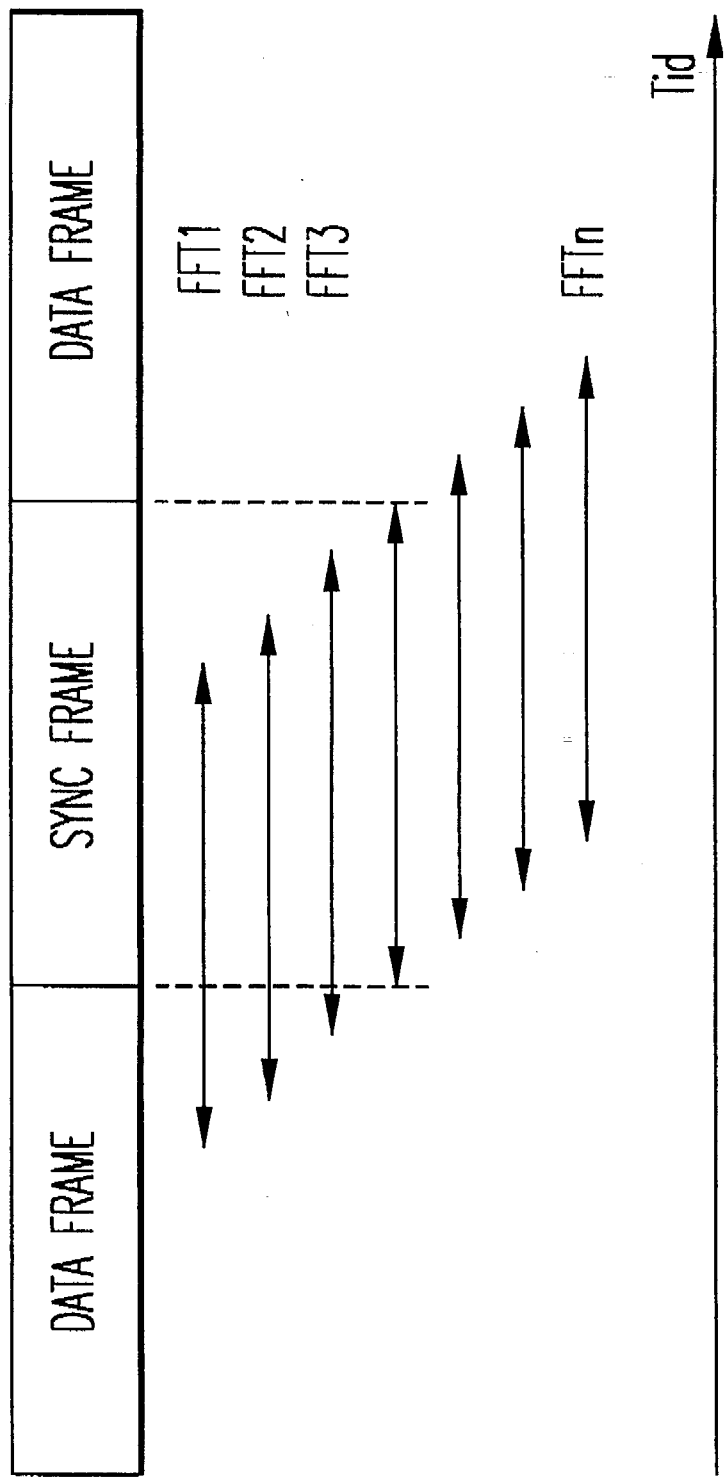

As shown in FIG. 3, first more samples are taken than the FFT length over the area where the synchronization frame is calculated to be in time. A series of FFT operations overlapping in time, sliding FFT, is carried out on these samples, in order to find the position of the time slot where the synchronization frame is situated.

After each FFT operation, cross-correlation is carried out against the known frequency function of the synchronization frame. Since the phase of the respective frequency was selected as PRBS sequences, the cross-correlation will give a very well-defined amplitude maximum only in the time slot which contains the synchronization frame. This cross-correlation maximum is detected for each time shift of the signal, and at the time shift where the greatest (only) maximum is obtained this is used as the time base for the subsequent data.

The phase for the cross-correlation maximum shows clearly the phase of the synchronization frame and is used for phase compensation when detecting the subsequent data.

The cross-correlation also provides information on frequency deviations. These deviations usually arise as a result of deviations between the oscillators of the transmitter and receiver, but can also arise as a result of Doppler effects in mobile systems. The frequency error appears by the amplitude maximum in the cross-correlation varying around the midpoint in the sequence (maximum in the midpoint—no frequency error). If the amplitude maximum is moved one step in the sequence it corresponds to a frequency drift on an FFT-point's resolution frequency separation.

Another characteristic of the method is that the phase deviation and amplitude for various frequencies in different parts of the frequency spectrum can be read off directly from the FFT for the synchronization sequence which can be used for channel estimation in the event of frequency-selective fading.

Figure 4:
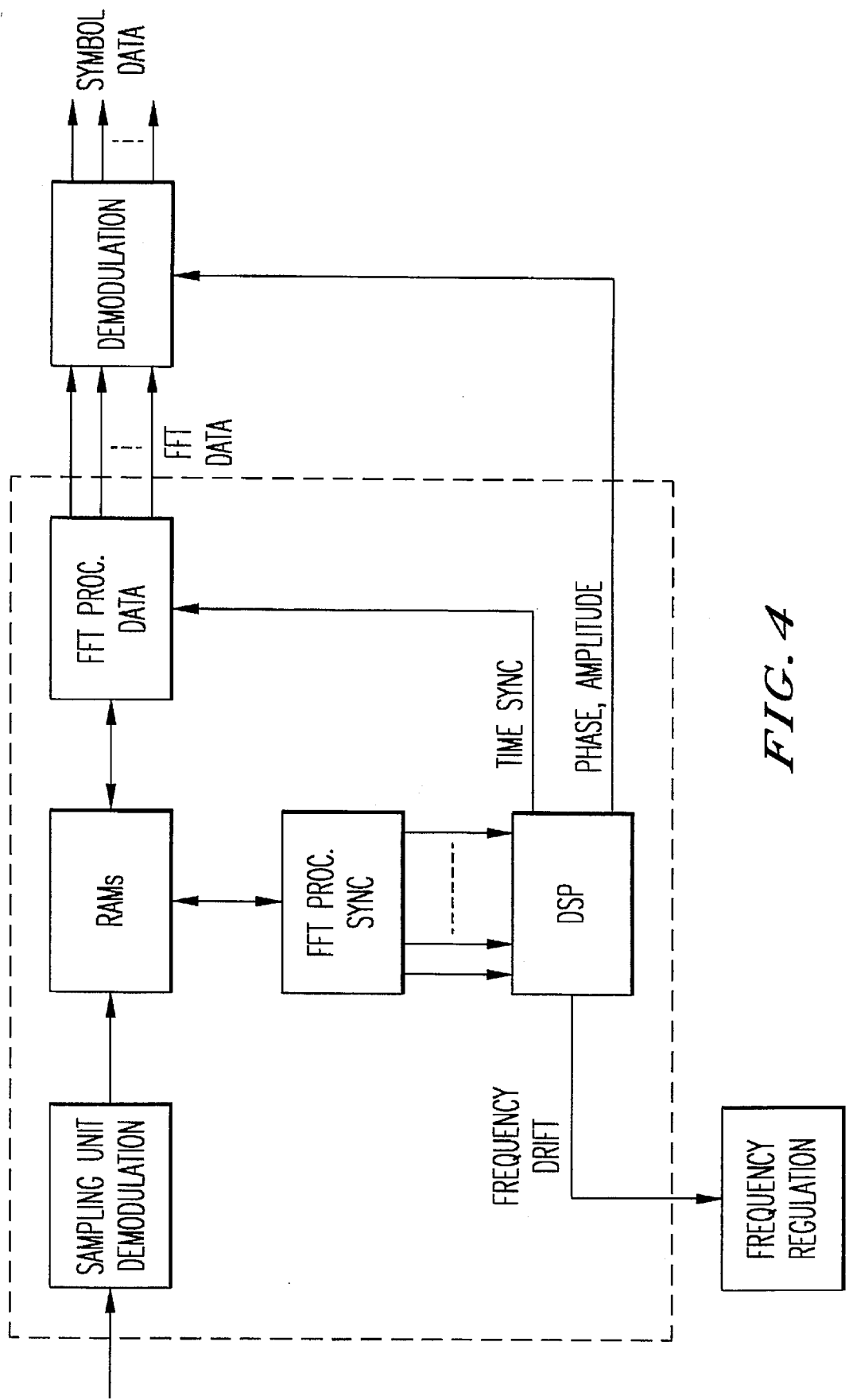

FIG. 4 shows a block diagram of the synchronization component in the receiver in accordance with the present invention.

The receiver consists of a sampling unit, direct memory (RAM), FFT processors and digital signal processors (DSP).

The sampling unit digitizes the signal by sampling and buffers this in the RAM memory (complex signal). The RAM memory acts as buffer for a sufficient quantity of data of the signal so that the time reference for data detection is able to be given as an address-offset to this memory (circular buffer).

There are two FFT processors in the receiver. One FFT processor is for detecting data and the other FFT processor is for detecting synchronization parameters. The result of the operation from the FFT processor used for synchronization is read in by DSP units and processed for estimating the synchronization parameters.

The parameter for time synchronization is given to the address handler for the FFT processor for data detection as an address-offset to the RAM memory, ie where this is to begin to read in the data.

The estimated parameter for phase turning is given to the demodulation unit after the FFT processor. This unit demodulates each subcarrier channel and corrects phase and amplitude.

The frequency drift which is measured is used by a frequency regulating unit which is not part of the invention. Frequency regulation can be carried out in various ways. One way is to control numerically controlled oscillators (NCO) by mixing and to feed back the result to the regulator. Another way is to compensate for the frequency drift digitally before the FFT operation in the receiver with similar feed-back.

An FFT processor is a signal processor optimized for vectorial operations on large data quantities, such as FFT, correlation and FIR filtering. This type of processor is considerably quicker than general signal processors for these types of operation.

The FFT processor is adapted for carrying out the operations in the frequency plane. By this is meant that the architecture is optimized for carrying out FFT (Fast Fourier Transform) on incoming data. After the FFT operation, filtering and correlation, etc, can be carried out in the frequency plane as vectorial multiplying by the frequency function of the transmission function. The FFT processor has a memory structure which is so constructed that what is known as ping-pong technique can be used. By this is meant that data is read from one RAM memory, processed in the FFT processor and stored in the second RAM memory. The parameters or coefficients which are used for each operation are stored in a special RAM memory.

In the synchronization method in accordance with the invention the FFT processor is used for sliding cross-correlation in the frequency plane against the received synchronization frame. A general arrangement for the operations for the FFT processor can be described by the following pseudo code:

```
for j=(tau_old-k) to (tau_old+k) do
    f=FFT(s(j to j+fft_len-1))
    c=corr(f_sync,f)
    save_to_DSP(c)
end
```

A correlation in the frequency plane can be carried out by multiplying the data by the time function of the synchronization frame in the time plane before the FFT operation. This method is considerably more efficient than carrying out the operation by a correction after the FFT operation and is therefore used in this invention. An advantage of this procedure is that the FFT processor supports this operation, which it does not do for a pure correction. The pseudo code can thereby be modified for this synchronization method by:

```
for j=(tau_old-k) to (tau_old+k) do
    sm=conjugate(t_sync)*s(j to j+fft_len-1)
    c=FFT(sm)
    save_to_Dsp(c)
end
```

The operations which the FFT processor carries out are then as follows in descriptive text:

1. Read in the input signal sample from the previous time base tau_old. From tau_old-k to (tau_old+k-fft_len) the input signal sample is stored in the RAM memory. The factor k is selected dependent upon the maximal time shift which is calculated and upon how often this is updated. The calculating capacity which is available is also decisive.

2. For each time shift of the stored input signal, multiplication by the time function of the synchronization frame is carried out. This is stored in a bank in the coefficient RAM memory. After multiplication, FFT is carried out on the result, giving the cross-correlation in the frequency plane. The cross-correlation is stored for further processing by DSP.

3. When all operations above have been carried out for all time shifts of the signal and the new time base, tau_new, has been estimated, a further FFT operation is carried out for the new time base. This operation is carried out without frequency correlation and is to estimate the channel's distortion of the synchronization frame. This gives values for phase and amplitude distortion for the whole frequency spectrum, which permits compensation when demodulating data.

It is of the greatest importance to minimize the load on the DSP processor for broad-band signal processing since this is to the power ten slower than FFT processors in calculating capacity. However, a DSP processor has a considerably greater instruction set than a vector processor and can therefore perform operations which are more or less impossible with a vector processor. Examples of such operations are scalar operations such as comparisons, bit manipulation, memory operations and the ability to construct large complex program structures.

In accordance with the invention, the DSP processors have the task of reading in the correlation sequences which are obtained from the FFT processor. From these correlation sequences, the DSP can find the correlation maximum and calculate its time base and phase turning. The time base is used for controlling the sampling of data to the FFT processor for data demodulation. The phase turning is supplied to the demodulating unit after the FFT processor where phase compensation and correction take place.

After this, the frequency drift is estimated by processing the correlation sequence's selected time base. This parameter is used by the unit for frequency regulation.

The DSP also processes the channel estimate which is obtained from the FFT operation for the correct time base and supplies this to the demodulation unit.

In this way the present invention provides a method and apparatus for synchronization of an OFDM system.

The invention has the following advantages compared with previously known techniques:

The synchronization is based on the whole frequency spectrum.

The transmitter and receiver in an OFDM modem operate in the frequency domain. According to the invention, all synchronization parameters in the frequency domain are estimated, which gives a similar hardware architecture to that for demodulation of data.

OFDM modulation by FFT technique automatically gives a high level of controllability of discrete frequencies and their phase position.

The method gives a relatively high proportion of synchronization parameters from the same operations: time shift, phase turning, frequency drift and channel estimating.

The method includes acquisition, ie finding the above-mentioned initial parameters for the subsequent data, but provides a good basis for tracking (phase compensation, frequency regulation and channel correction during demodulation).

An accurate estimate of frequency drift gives high potential for digital frequency regulation. By this is meant that if the limits of the frequency error are known, ie lie within a known interval, instead of regulation via analog components (numerically controlled oscillators, etc) regulation of the sampled signal can be carried out digitally.

Instead of inserting special synchronization frames, what are known as "guard spaces" in the data frames can be used as synchronization frames. This means that no degradation of transmission capacity is required for the synchronization. However, during synchronization the synchronization frame must be sampled at the same rate as the data frame and a shorter FFT carried out (type ⅛ data FFT) on this, which gives a worse resolution in frequency and correlation. This has, however, the advantage that the FFT operation is carried out much more quickly.

We claim:

1. A method for synchronizing a transmitter and a receiver in an orthogonal frequency division multiplexing system, comprising the steps of:

forming a first synchronization frame based on synchronization information including a known frequency function including a set of frequencies and respective known phase positions at said transmitter, comprising applying an inverse fast Fourier transform to said synchronization information;

forming a data frame based on information data at said transmitter, comprising applying the inverse fast Fourier transform to said information data;

transmitting said first synchronization frame in a first time slot, said data frame in a second time slot, and a second synchronization frame in a third time slot after a known time interval after said first time interval;

performing a series of time-shifted fast Fourier transform operations on said first synchronization frame at said receiver;

cross-correlating respective results of said series of time-shifted fast Fourier transform operations with said frequency function to obtain respective correlation results at said receiver;

determining a position of said first time slot by detecting a correlation maximum based on said respective correlation results at said receiver; and using said position determined in said determining step as a time base to synchronize said receiver on said data frame.

2. The method of claim 1, wherein said step of forming a first synchronization frame comprises forming said first synchronization frame with said known phase positions comprising a random pattern.

3. The method of claim 1, wherein:

said step of forming a first synchronization frame comprises generating said set of frequencies in a frequency plane with a predetermined phase, and wherein said applying step comprises calculating the inverse fast Fourier transform of the set of frequencies; and said step of transmitting said first synchronization frame comprises transmitting said first synchronization frame in a predetermined time slot between said first data frame in said second time slot and another data frame in a fourth time slot.

4. The method of claim 2, wherein:

said step of forming a first synchronization frame comprises generating said set of frequencies in a frequency plane with a predetermined phase, and wherein said applying step comprises calculating the inverse fast Fourier transform of the set of frequencies; and said step of transmitting said first synchronization frame comprises transmitting said first synchronization frame in a predetermined time slot between said first data frame in said second time slot and another data frame in a fourth time slot.

5. The method of claim 3, wherein said step of forming a first synchronization frame comprises reading the first synchronization frame from an EPROM during the first the predetermined time slot.

6. The method of claim 1, wherein said step of performing a series of time-shifted fast Fourier transform operations comprises:

calculating a time duration in which said first synchronization frame is expected to occur;

sampling more samples than a length of one of the fast Fourier transform operations over the time duration where the first synchronization frame is expected to occur; and performing the series of time-shifted fast Fourier transform operations as overlapping operations using the samples.

7. The method of claim 2 wherein said step of performing a series of time-shifted fast Fourier transform operations comprises:

calculating a time duration in which said first synchronization frame is expected to occur;

sampling more samples than a length of one of the fast Fourier transform operations over the time duration where the first synchronization frame is expected to occur; and performing the series of time-shifted fast Fourier transform operations as overlapping operations using the samples.

8. The method of claim 3, wherein said step of performing a series of time-shifted fast Fourier transform operations comprises:

calculating a time duration in which said first synchronization frame is expected to occur;

sampling more samples than a length of one of the fast Fourier transform operations over the time duration where the first synchronization frame is expected to occur; and performing the series of time-shifted fast Fourier transform operations as overlapping operations using the samples.

9. The method of claim 4, wherein said step of performing a series of time-shifted fast Fourier transform operations comprises:

calculating a time duration in which said first synchronization frame is expected to occur;

sampling more samples than a length of one of the fast Fourier transform operations over the time duration where the first synchronization frame is expected to occur; and performing the series of time-shifted fast Fourier transform operations as overlapping operations using the samples.

10. The method of claim 5, wherein said step of performing a series of time-shifted fast Fourier transform operations comprises:

calculating a time duration in which said first synchronization frame is expected to occur;

sampling more samples than a length of one of the fast Fourier transform operations over the time duration where the first synchronization frame is expected to occur; and performing the series of time-shifted fast Fourier transform operations as overlapping operations using the samples.

11. An apparatus for synchronizing signals in an orthogonal frequency division multiplexing system, comprising:

a transmitter configured to transmit a first synchronization frame in a first time slot based on synchronization information including a known frequency function having a set of frequencies and respective known phase positions, and a data frame based on data in a second time slot, comprising, an inverse fast Fourier operator configured to apply a fast Fourier operation to said synchronization information so as to form said first synchronization and to said data so as to form said data frame; and a receiver configured to calculate a time base for receiving said data frame based on said first synchronization frame, comprising, a sampling unit configured to produce digital samples of the first synchronization frame transmitted from said transmitter, a random access memory configured to store said digital samples, a fast Fourier processor comprising,
   a first mechanism configured to detect said data in said data frame by processing said data with a fast Fourier transform process based on said time base,
   a second mechanism configured to perform a series of time-shifted fast Fourier transform operations on said first synchronization frame and cross-correlate respective transform results with a predetermined signal based on said known frequency function so as to produce respective cross-correlation results, and
a data processor configured to read in said respective cross-correlation results and calculate the time base based on a maximum result of said respective cross-correlation results.

12. The apparatus of claim 11, wherein said fast Fourier processor comprises a digital signal processor that is optimized for vectorial operations on large quantities of data.

13. The apparatus of claim 12, wherein said first mechanism and said second mechanism each comprise respective computer-based processes.

14. The apparatus of claim 11 further comprising a digital signal processor, said digital signal processor comprising said fast Fourier processor and said data processor.

* * * * *